(12) United States Patent
Mineda (10) Patent No.: US 10,540,156 B2
(45) Date of Patent: Jan. 21, 2020

(54) PARALLELIZATION METHOD, PARALLELIZATION TOOL, AND IN-VEHICLE DEVICE

(71) Applicant: DENSO CORPORATION, Kariya, Aichi-pref. (JP)

(72) Inventor: Kenichi Mineda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/617,038

(22) Filed: Jun. 8, 2017

(65) Prior Publication Data

US 2017/0364341 A1    Dec. 21, 2017

(30) Foreign Application Priority Data

Jun. 21, 2016  (JP) ................................. 2016-122769

(51) Int. Cl.
*G06F 8/41* (2018.01)
*G06F 9/48* (2006.01)
(Continued)

(52) U.S. Cl.
CPC ............... *G06F 8/45* (2013.01); *G06F 8/451* (2013.01); *G06F 8/456* (2013.01); *G06F 9/4881* (2013.01); *G06F 9/5005* (2013.01); *G06F 9/52* (2013.01)

(58) Field of Classification Search
None
See application file for complete search history.

(56) References Cited

U.S. PATENT DOCUMENTS

| | | | | |
|---|---|---|---|---|
| 5,802,338 A | * | 9/1998 | Rechtschaffen | ........ G06F 8/456 712/216 |
| 6,292,939 B1 | * | 9/2001 | Itou | ........................ G06F 8/458 712/E9.032 |

(Continued)

FOREIGN PATENT DOCUMENTS

| | | |
|---|---|---|
| JP | 2009-258962 A | 11/2009 |
| JP | 2014-010754 A | 1/2014 |
| WO | 2008/072334 A1 | 3/2010 |

OTHER PUBLICATIONS

"Implementation Method of Communication Protocols Using Processor-per-layer Parallel Processing for Shared Memory Multiprocessor Systems" authored by Sato et al, Sep. 15, 1998, vol. 39 No. 9, pp. 2727-2740, Transaction of Information Processing Society of Japan (and English translation thereof).

(Continued)

*Primary Examiner* — Matthew J Brophy
(74) *Attorney, Agent, or Firm* — Posz Law Group, PLC (57) ABSTRACT

A computer generates a parallel program, based on an analysis of a single program that includes a plurality of tasks written for a single-core microcomputer, by parallelizing parallelizable tasks for a multi-core processor having multiple cores. The computer includes a macro task (MT) group extractor that analyzes, or finds, a commonly-accessed resource commonly accessed by the plurality of tasks, and extracts a plurality of MTs showing access to such commonly-accessed resource. Then, the computer uses an allocation restriction determiner to allocate the extracted plural MTs to the same core in the multi-core processor. By devising a parallelization method described above, an overhead in an execution time of the parallel program by the multi-core processor is reduced, and an in-vehicle device is enabled to execute each of the MTs in the program optimally.

11 Claims, 9 Drawing Sheets

(51) Int. Cl.
*G06F 9/52* (2006.01)
*G06F 9/50* (2006.01)

(56) References Cited

U.S. PATENT DOCUMENTS

| | | | | |
|---|---|---|---|---|
| 7,926,046 B2* | 4/2011 | Halambi | ............... | G06F 8/4452 |
| | | | | 717/106 |
| 8,417,919 B2* | 4/2013 | Allen | ................... | G06F 9/5038 |
| | | | | 712/216 |
| 8,438,359 B2* | 5/2013 | Kasahara | ............... | G06F 8/453 |
| | | | | 711/129 |
| 9,760,355 B2* | 9/2017 | Mori | ....................... | G06F 8/452 |
| 10,228,923 B2* | 3/2019 | Yatou | ...................... | G06F 8/458 |
| 10,228,948 B2* | 3/2019 | Mineda | ..................... | G06F 9/38 |
| 10,296,316 B2* | 5/2019 | Mineda | ................... | G06F 8/456 |
| 2004/0194074 A1* | 9/2004 | Shibayama | ............ | G06F 8/456 |
| | | | | 717/151 |
| 2007/0169059 A1* | 7/2007 | Halambi | ............... | G06F 8/4452 |
| | | | | 717/160 |
| 2007/0283358 A1* | 12/2007 | Kasahara | ............. | G06F 9/5044 |
| | | | | 718/104 |
| 2009/0254892 A1 | 10/2009 | Yamashita | | |
| 2010/0070740 A1* | 3/2010 | Allen | ................... | G06F 9/5038 |
| | | | | 712/30 |
| 2010/0174876 A1* | 7/2010 | Kasahara | ............... | G06F 8/453 |
| | | | | 711/154 |
| 2011/0231605 A1* | 9/2011 | Ogawa | .................... | G06F 3/061 |
| | | | | 711/114 |
| 2012/0047353 A1* | 2/2012 | Gupta | .................... | G06F 8/314 |
| | | | | 712/220 |
| 2012/0159507 A1* | 6/2012 | Kwon | .................. | G06F 9/5088 |
| | | | | 718/104 |
| 2012/0239910 A1* | 9/2012 | Gonion | ..................... | G06F 8/41 |
| | | | | 712/222 |
| 2013/0031560 A1* | 1/2013 | Gargash | .............. | G06F 11/3013 |
| | | | | 718/104 |
| 2014/0026145 A1* | 1/2014 | Canedo | .................... | G06F 8/433 |
| | | | | 718/105 |
| 2014/0165077 A1* | 6/2014 | Martinez Canedo | ... | G06F 8/451 |
| | | | | 718/105 |
| 2014/0281435 A1* | 9/2014 | Perkins | ............... | G06F 9/30145 |
| | | | | 712/227 |
| 2014/0372995 A1* | 12/2014 | Mori | ...................... | G06F 8/452 |
| | | | | 717/146 |
| 2015/0363230 A1* | 12/2015 | Kasahara | .............. | G06F 9/4881 |
| | | | | 718/106 |
| 2016/0291949 A1* | 10/2016 | Mineda | .................... | G06F 8/456 |
| 2016/0291950 A1* | 10/2016 | Yatou | ...................... | G06F 8/458 |
| 2017/0168790 A1* | 6/2017 | Mineda | .................... | G06F 8/456 |
| 2017/0357511 A1* | 12/2017 | Mineda | ..................... | G06F 9/38 |

OTHER PUBLICATIONS

"A Parallel Algorithm for an Octree Generation from a Polyhedral Shape Representation" authored by Kitamura et al, Sep. 20, 1996, vol. 50, No. 9, pp. 1319-1325, Transaction of the Institute of Television Engineers (and English translation thereof).

* cited by examiner

FIG. 12 though the parallel program may be generated by parallelizing those tasks, a synchronization process is required for parallelizing the multiple tasks, which makes it necessary for the RTOS to allocate a process time for the synchronization process.

PARALLELIZATION METHOD, PARALLELIZATION TOOL, AND IN-VEHICLE DEVICE

CROSS REFERENCE TO RELATED APPLICATION

The present application is based on and claims the benefit of priority of Japanese Patent Application No. 2016-122769, filed on Jun. 21, 2016, the disclosure of which is incorporated herein by reference.

TECHNICAL FIELD

The present disclosure generally relates to a parallelization method and a parallelization tool respectively for generating a parallel program for a multi-core microcomputer based on a single program for a single-core microcomputer, and an in-vehicle device to which the generated parallel program is implemented.

BACKGROUND INFORMATION

A parallelization compile method disclosed in a patent document, Japanese Patent Laid-Open No. 2015-1807 (patent document 1) listed below, for example, serves as a parallelization method to generate a parallel program for a multi-core microcomputer based on a single program for a single-core microcomputer.

In such parallelization compile method, an intermediate language is generated from a source code of the single program by performing a lexical analysis and a syntax analysis, and, by using such an intermediate language, a dependency analysis and optimization and the like of a plurality of macro tasks (i.e., unit processes hereafter) are performed. Further, the parallelization compile method generates the parallel program based on a scheduling of the plurality of unit processes, which takes into account the dependency of each of the unit processes, and an execution time of each of the unit processes.

However, in a general embedded system, multiple tasks are executed in a switching manner by a real time operating system (RTOS). In such case, even though the parallel program may be generated by parallelizing those tasks, a synchronization process is required for parallelizing the multiple tasks, which makes it necessary for the RTOS to allocate a process time for the synchronization process.

That means, when the parallel program is relatively small, the process time reduced by the parallelization of the multiple tasks is surpassed by an overhead time that is required by the synchronization process. Therefore, the benefit of parallelization may not necessarily be enjoyed by all multi-task programs. In other words, the relatively short process time tasks are not suitably parallelized.

Further, the parallelization of the above-described tasks with the shot process time is not only difficult, but also is prone to an interference with other tasks, which makes it more difficult to execute in parallel, i.e., simultaneously.

For addressing parallelization of the short process time tasks, performing an inter-core exclusion process in addition to a relevant process may be one solution. However, the inter-core exclusion process has a much greater overhead in comparison to an intra-core exclusion process used in the single core microcomputer, which may greatly deteriorate the processing capacity of the multi-core microcomputer.

SUMMARY

It is an object of the present disclosure to provide a parallelization method and a parallelization tool that are capable of generating a parallel program that suitably reduces an overhead in an execution time of such program by the multi-core microcomputer, and an in-vehicle device that is capable of suitably/optimally executing each of the unit processes in the parallel program.

In an aspect of the present disclosure, a parallelization method that generates a parallel program for a multi-core microcomputer having multiple cores. The parallel program parallelizes parallelizable unit processes based on (i) an analysis of a single program for a single-core microcomputer that includes multiple tasks, and (ii) a dependency relationship derived from the analysis and indicative of an access to a same resource from the unit processes. The parallelization method includes an extraction procedure that extracts a plurality of the unit processes accessing the same resource based on an analysis of the same resource commonly accessed by the multiple tasks, and an allocation procedure allocating the plurality of the unit processes extracted by the extraction procedure to a same core of the multi-core microcomputer.

The present disclosure is thus enabled to extract unit processes that access the same resource from among the unit processes included in different tasks, due to an analysis of a commonly-accessed resource and an extraction of a plurality of unit processes that access the commonly-accessed resource.

Further, the present disclosure is enabled to reduce or eliminate the inter-core exclusion process due to the allocation of a plurality of the extracted unit processes to the same core of the multi-core microcomputer.

Therefore, the present disclosure is enabled to generate a parallel program that is capable of reducing an overhead in the execution time of such program.

In another aspect of the present disclosure, a parallelization tool including a computer for generating a parallel program by parallelizing parallelizable unit processes for a multi-core microcomputer having multiple cores based on a dependency relationship indicative of an access to a same resource from plural unit processes of a single program, according to an analysis of a single program including multiple tasks for a single-core microcomputer. The parallelization tool includes an extractor extracting a plurality of the unit processes accessing the same resource based on an analysis of the same resource commonly accessed by the multiple tasks; and an allocator allocating the plurality of the unit processes extracted by the extractor to a same core of the multi-core microcomputer.

Therefore, the parallelization tool of the present disclosure is enabled to generate a parallel program that is capable of reducing an overhead in the execution time of such program, similarly to the above-described parallelization method.

In yet another aspect of the present disclosure, an in-vehicle device includes a multi-core microcomputer having multiple cores, and a parallel program parallelizing a plurality of unit process in a single program for a single-core microcomputer, for processing multiple tasks by a single core. The parallel program is configured to (a) parallelize the multiple tasks by parallelizing a plurality of parallelizable unit processes based on a data dependency indicative of an access to a same resource from plural unit processes of the single program, according to an analysis of the single program including the multiple tasks for the single-core microcomputer, (b) extract the plural unit processes based on indication of an access to the commonly-accessed resource, by analyzing a commonly-accessed resource commonly accessed from the multiple tasks, and (c) allocate the extracted plural unit processes to the same core of the multi-core microcomputer. Also, the multi-core microcomputer is configured to execute the unit processes assigned to the multiple cores.

The in-vehicle device is provided with the multi-core microcomputer and the parallel program generated in the above-described manner. Further, each of the multiple cores of the multi-core microcomputer executes the parallel program. That is, the in-vehicle device of the present disclosure executes the parallel program that reduces the overhead. Therefore, the in-vehicle device is capable of optimally executing each of the unit processes.

BRIEF DESCRIPTION OF THE DRAWINGS

Objects, features, and advantages of the present disclosure will become more apparent from the following detailed description made with reference to the accompanying drawings, in which.

DETAILED DESCRIPTION

A couple of embodiments for carrying out the present disclosure are described with reference to the drawing in the following.

In each of the plural embodiments, the same component/configuration has the same reference numeral as preceding embodiments, and the description of the same component/configuration is not repeated. In each of the plural embodiments, when a part of a configuration is described, the rest of the configuration may be borrowed from the preceding embodiments.

In the present embodiment, a computer 10 is adopted as a device, which generates a parallel program 21a1 parallelized for a multi-core processor 21 having a first core 21c and a second core 21d from multiple unit processes in a single program 30 (e.g., a series C source) for a single-core microcomputer having only one core.

Further, in the present embodiment, an automatic parallelization compiler 1 for generating the parallel program 21a1 is adopted. Further, in the present embodiment, an in-vehicle device 20 provided with the parallel program 21a1 that is generated by the computer 10 is adopted. Note that a processor may be designated as a microcomputer. Therefore, the multi-core processor may be restated as the multi-core microcomputer.

The automatic parallelization compiler 1 includes a procedure for generating the parallel program 21a1. Therefore, the automatic parallelization compiler 1 is equivalent to a parallelization method in the claims.

Further, the automatic parallelization compiler 1 is a program including the parallelization method. Further, the computer 10 generates the parallel program 21al by executing the automatic parallelization compiler 1.

Therefore, the computer 10 is equivalent to a parallelization tool in the claims.

Note that the single program 30 includes multiple tasks 31 and 32, and is thus executed as switching execution of the multiple tasks 31 and 32 by an embedded Real-Time Operating System (RTOS).

The computer 10 generates the parallel program 21a1 which parallelizes each of the multiple tasks 31 and 32 in the single program 30.

The automatic parallelization compiler 1 is for generating the parallel program 21a1 which parallelizes each of the multiple tasks 31 and 32 in the single program 30.

As a background for generating the parallel program 21a1, the following problems such as an increase of a heat generation amount from a processor, an increase of an electric power consumption by the processor, a maximum clock frequency of the processor, and an increase of popularity of the multi-core processor. That is, even in a field of an in-vehicle device, the use of the multi-core processor 21 is now in a main stream, which makes it necessary to adapt control programs to the multi-core processor.

Further, the parallel program 21al must be developed in low cost in a short term, and must have high reliability and high performance and high process execution speed.

When generating the parallel program 21a1, a data dependency relationship of the multiple unit processes of the single program 30 is analyzed, and the multiple unit processes are allocated, or assigned/arranged, to the different cores 21c and 21d of the multi-core processor 21. Regarding details of such allocation, please refer to a patent document JP 2015-1807 A.

In the present embodiment, the single program 30 written in C language is adopted, for an example. However, the single program 30 may also be written in a different programming language other than C language.

The above-mentioned unit process may be restated as a processing block, a macro task, or the like. In the following, the unit process may also be designated as Macro Task (MT).

Figure 5:
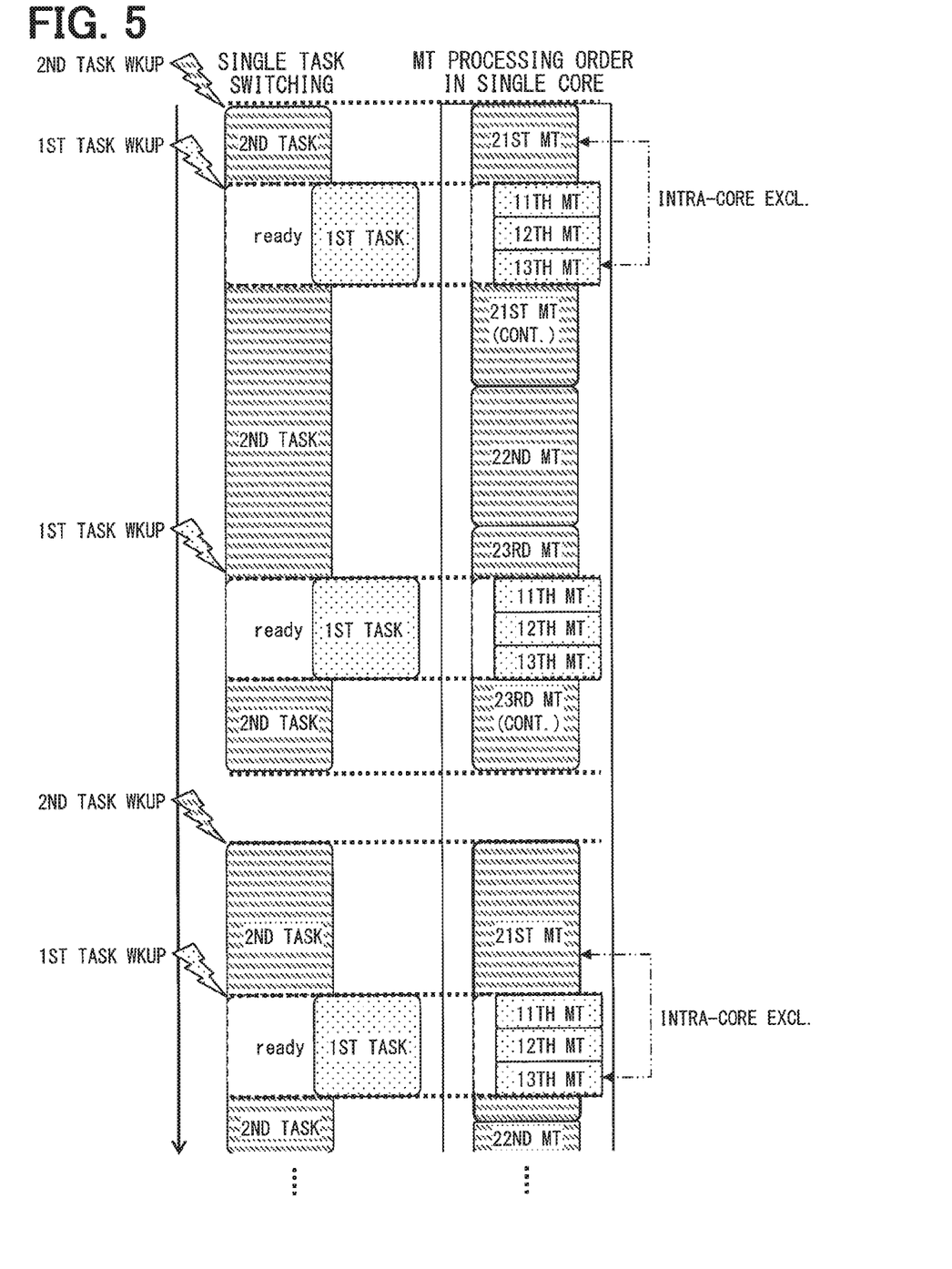
FIG. 5 is an illustration of a single program in the embodiment of the present disclosure.

According to the present embodiment, as shown in FIG. 5 etc., an 11th MT-a 13th MT, and a 21st MT-a 23rd MT are adopted as an example.

Each of the MTs includes at least one instruction that is executable by the first core 21c and the second core 21d.

Here, the single program 30 adopted in the present embodiment is described with reference to FIG. 3.

Figure 3:
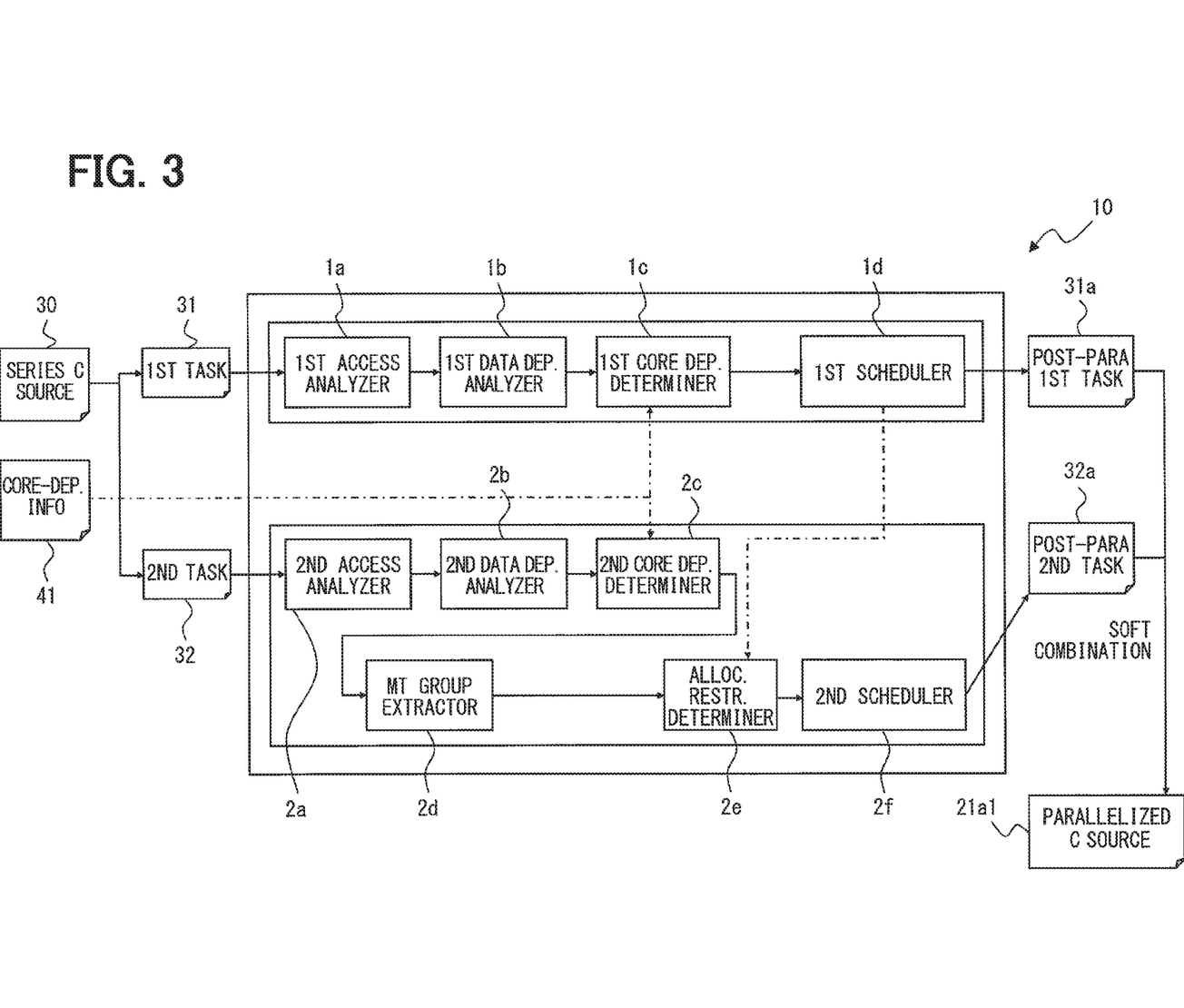
FIG. 3 is a block diagram of functions of the computer in the embodiment of the present disclosure.

A series C source 30 of FIG. 3 is equivalent to the single program 30 in the claims. Further, in FIG. 3, a task switching process in the single-core microcomputer and a MT processing order in the single-core are illustrated.

The single program 30 includes a first task 31 and a second task 32, and, at timings of each of wake-ups (WKUP in FIG. 5), for example, the first task 31 and the second task 32 are switched and executed.

Note that, in FIGS. 5-10, for the distinction among different tasks, the MT of the first task 31 and the MT of the second task 32 have different hatchings from each other.

Figure 6:
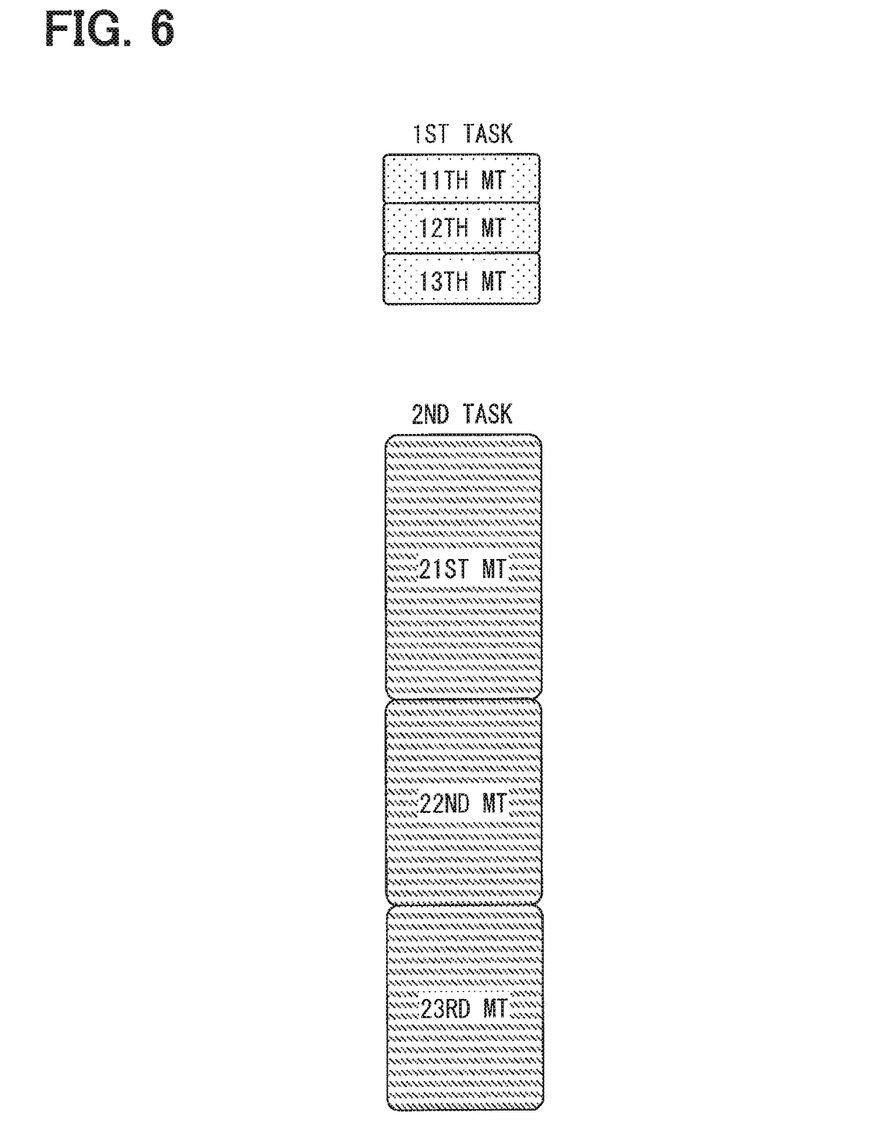
FIG. 6 is an illustration of a processing order of MTs in each task in the embodiment of the present disclosure.

As shown in FIG. 6, the 11th MT—the 13th MT are included in the first task 31. The processing order of those MTs in the first task 31 is from the 11th MT, to the 12th MT, and to the 13th MT.

On the other hand, the 21st MT—the 23rd MT are included in the second task 32. The processing order of those MTs in the second task 32 is from the 21st MT, to the 22nd MT, and to the 23rd MT.

Note that, in the present embodiment, the first task 31 is assumed to have a higher priority higher than the second task 32.

The multiple MTs include Inter-dependent MTs, among which two MTs depend on the same data, or an update of the two MTs is associated by way of the same data. That may also be designated as having a data dependency relationship, or more simply as having a data dependency in the drawing.

Figure 7:
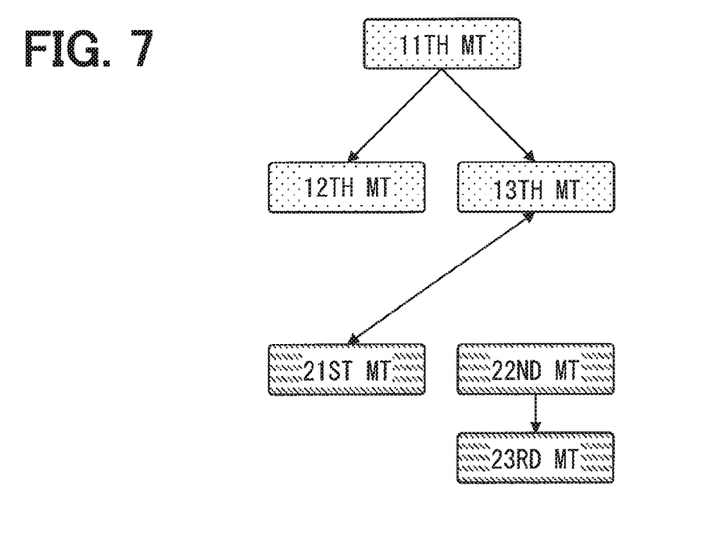
FIG. 7 is an illustration of data dependency relationships in each task in the embodiment of the present disclosure.

According to the present embodiment, the data dependency relationship is found/established among the 11th MT and the 12th MT, among the 11th MT and the 13th MT, and among the 13th MT and the 21st MT. In FIG. 7, the inter-dependent MTs having a data dependency relationship with each other are connected by an arrow.

The data dependency relationship is a relationship of accessing the same data from/by the two MTs. The data dependency relationship may also be understood as an access of each of the two MTs to the same resource.

Therefore, the two MT with the data dependency relationship show access to the common resource. Thus, two or more data dependency relationships are found in the single program 30 including multiple MTs. In the following, the same resource to which the multiple MTs access may also be designated as the common resource.

Further, the data dependency relationship is categorized into the first to third cases.

The first case is a relationship in which a first MT writes to the data (Write) and a second MT reads from the same data (Read). The second case is a relationship in which the first MT and the second MT respectively write to the same data. The third case is a relationship in which the first MT reads from the data and the second MT writes to the same data. Execution sequence (i.e., processing order) of the first MT is prior to the second MT in the single program 30. The first MT and the second MT are example MTs used in order to explain/illustrate the data dependency relationship.

Further, the single program 30 includes the intra-core exclusion process, in order to avoid interference among two MTs that are included in different tasks and access the same data.

Therefore, the single-core microcomputer performs the intra-core exclusion process.

According to the present embodiment, as shown in FIG. 5, in order to avoid interference between the 13th MT of the first task 31 and the 21st MT of the second task 32, an example of including the intra-core exclusion process is adopted. The intra-core exclusion process is a process that performs a task interruption prohibition, and a task interruption permission.

For example, when the first task 31 is being performed, an Interruption of the second task 32 is prohibited, and upon completing execution of the first task 31, an interruption of the second task 32 is permitted.

Further, the parallel program in which two inter-dependent MTs with the data dependency relationship are allocated to the different cores may include the inter-core exclusion process, in order to avoid interference between the different cores.

However, the inter-core exclusion process has a greater overhead in comparison to the intra-core exclusion process, and is a major factor of capacity deterioration.

Figure 1:
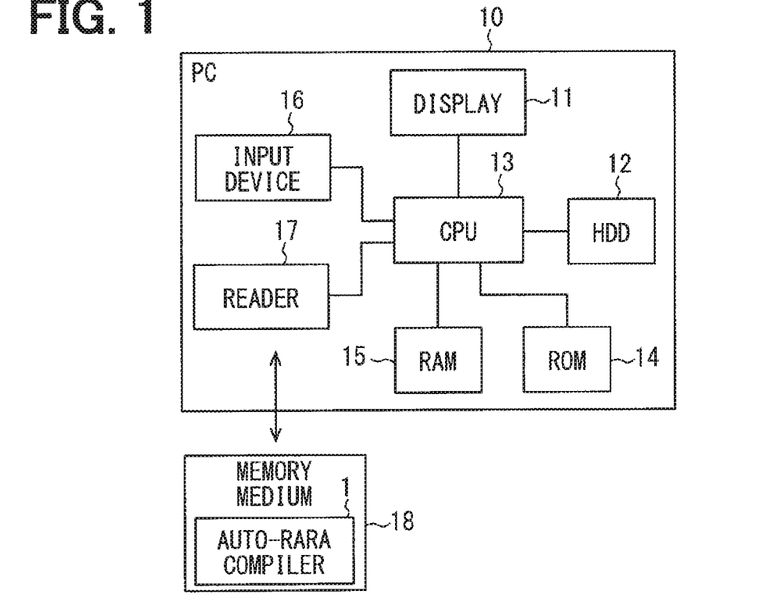
FIG. 1 is a block diagram of a configuration of a computer in an embodiment of the present disclosure.

Here, the configuration of the computer 10 is described with reference to FIG. 1 and FIG. 3.

The computer 10 is provided with a display 11, a Hard Disk Drive (HDD) 12, a Central Processing Unit (CPU) 13, a Read-Only Memory (ROM) 14, a Random Access Memory (RAM) 15, an input device 16, a reader 17, and the like. The computer 10 is capable of reading a memory content memorized by a memory medium 18. The automatic parallelization compiler 1 is memorized by the memory medium 18. Therefore, the computer 10 is capable of performing the automatic parallelization compiler 1 memorized by the memory medium 18, and generates the parallel program 21a1.

Regarding the configuration of the computer 10 and the memory medium 18, please refer to a personal computer 100 and a memory medium 180 disclosed in a patent document JP 2015-1807 A.

The automatic parallelization compiler 1 includes, in addition to what is disclosed by JP 2015-1807 A, an MT group extractor 2d, an allocation restriction determiner 2e, and the like.

Further, the computer 10 is provided with, as function blocks, blocks for the first task 31, and blocks for the second task 32, as shown in FIG. 3. The computer 10 generates a post-parallelization first task 31a by using the function block for the first task 31, and generates a post-parallelization second task 32a by using the function block for the second task 32. Then, the computer 10 soft-combines the post-parallelization first task 31a and the post-parallelization second task 32a to generate the parallel program 21a1. Note that the parallel program 21a1 may also be considered as a parallelized C source.

In the present embodiment, the computer 10, which is capable of obtaining core-dependency information 41, is adopted.

The core-dependency information 41 is equivalent to core allocation Information in the claims, and is information which shows which one of many MTs in the single program 30 is specified as being allocated to the core 21c or to the core 21d (i.e., information indicative of allocation destination of MT in the single program 30). Note that an allocation destination specified MT among the MTs in the single program 30 may be considered as dependent on the core specified as the allocation destination.

The function blocks for the first task 31 include a first access analyzer 1a, a first data dependency analyzer 1b, a first core dependency determiner 1c, a first scheduler 1d, and the like.

The first access analyzer 1a analyzes an access resource of each MT in the first task 31. That is, the first access analyzer 1a extracts a resource (i.e., data) which each MT in the first task 31 accesses.

The first data dependency analyzer 1b analyzes a data dependency relationship of each MT in the first task 31. The first data dependency analyzer 1b analyzes the data dependency relationship, and extracts parallelizable MT which can be parallelized.

The first core dependency determiner 1c determines (i) an allocation destination specified MT about which an allocation destination is specified among MTs in the first task 31 and (ii) an allocation destination of such MT based on the core-dependency information 41.

The first scheduler 1d performs core allocation and scheduling. The first scheduler 1d allocates, while performing scheduling, each MT in the first task 31 to the first core 21c or to the second core 21d. Then, the computer 10 optimally generates the post-parallelization first task 31a which is optimized.

The function blocks for the second task 32 include a second access analyzer 2a, a second data dependency analyzer 2b, a second core dependency determiner 2c, an MT group extractor 2d, an allocation restriction determiner 2e, a second scheduler 2f, and the like.

The second access analyzer 2a analyzes an access resource of each MT in the second task 32. That is, the second access analyzer 2a extracts a resource which each MT in the second task 32 accesses.

The second data dependency analyzer 2b analyzes a data dependency relationship of each MT in the second task 32. The second data dependency analyzer 2b analyzes the data dependency relationship, and extracts parallelizable MT which can be parallelized.

The second core dependency determiner 2c determines (i) an allocation destination specified MT about which an allocation destination is specified among MTs in the second task 32 and (ii) an allocation destination of such MT based on the core-dependency information 41.

The MT group extractor 2d extracts an MT group, or a group of MTs, which show access to the common resource from the different tasks (i.e., an extractor in the claims).

That is, the MT group extractor 2d analyzes a resource accessed in common from the different tasks, and extracts the multiple MTs, e.g., two MTs, which show access to the common resource. Therefore, the extracted MTs show access to the common resource and are included in different tasks.

Note that the computer 10 performs the function of the MT group extractor 2d by executing the automatic parallelization compiler 1. Therefore, the MT group extractor 2d may be equivalent to an extraction procedure in the claims.

The allocation restriction determiner 2e determines an allocation restriction of each MT in the second task 32, based on a result scheduling of the first scheduler 1d, a determination result of the second core dependency determiner 2c, and the extracted MT group (i.e., an allocator in the claims).

That is, the allocation restriction determiner 2e determines restrictions at the time of allocating each MT in the second task 32 to the first core 21c or to the second core 21d.

If it is described in full details, the allocation restriction determiner 2e allocates the multiple MTs extracted by the MT group extractor 2d to the same core in the multi-core processor 21 in consideration of the scheduling result of the first scheduler 1d and the determination result of the second core dependency determiner 2c.

Note that the allocation restriction determiner 2e gives priority to the allocation destination specified by the core-dependency information 41, for allocating the multiple MTs extracted by the MT group extractor 2d to the same core in the multi-core processor 21.

That is, the allocation restriction determiner 2e allocates the multiple MTs extracted by the MT group extractor 2d to the same core in the multi-core processor 21 within limits which do not change the allocation destination specified by the core-dependency information 41.

Note that, since the computer 10 executes the automatic parallelization compiler 1 to realize a function of the allocation restriction determiner 2e, the allocation restriction determiner 2e is considered as equivalent to an allocation procedure in the claims.

Further, the second scheduler 2f performs core allocation and scheduling. The second scheduler 2f allocates, while performing scheduling, each MT in the second task 32 to the first core 21c or to the second core 21d. Then, the computer 10 optimally generates the post-parallelization second task 32a, which is optimized.

Here, the processing operation of the computer 10 is described with reference to FIG. 4. Note that each of the steps S10-S16 shown below may be considered as equivalent to a procedure of the automatic parallelization compiler 1.

In Step S10, a processing object task is determined. That is, the computer 10 scans each task one by one, and determines the processing object task.

In Step S11, a resource is extracted. That is, the computer 10 extracts a resource which each MT in the processing object task accesses.

Step S11 may be considered as a process which the first access analyzer 1a and the second access analyzer 2a respectively perform.

In Step S12, a data dependency relationship is analyzed. That is, the computer 10 analyzes the data dependency relationship among each of the MTs in the processing object task.

Step S12 may be considered as a process which the first data dependency analyzer 1b and the second data dependency analyzer 2b respectively perform.

In Step S13, a core dependency of each MT is determined. That is, when there is the core-dependency information 41 implemented for functional safety reasons, for example, which specifies a core that executes a certain MT, the computer 10 determines the core dependency of each MT according to the core-dependency information 41.

Step S13 may be considered as a process in which the first core dependency determiner 1c and the second core dependency determiner 2c respectively perform.

In Step S14, the allocation restriction of each MT is determined. That is, the computer 10 extracts an MT group which show access to the common resource from the different tasks, and determines the allocation restriction of each MT within limits which do not violate the core-dependency information 41, when each MT has the core dependency.

That is, the computer 10 allocates the multiple MTs, which show access to the common resource from the different tasks, to the same core, without violating the core-dependency information 41.

According to the present embodiment, the 13th MT of the first task 31 and the 21st MT of the second task 32 are allocated to the first core 21c.

Step S14 may be considered as a process which the MT group extractor 2d and the allocation restriction determiner 2e respectively perform.

In Step S15, core allocation and scheduling are performed. That is, the computer 10 performs core allocation and scheduling about each MT in the processing object task according to the allocation restriction and the data dependency relationship.

Step S15 may be considered as a process in which the first scheduler id and the second scheduler 2f respectively perform.

Note that the computer 10 performs Steps S10-S15 by treating each of the two tasks 31 and 32 as a processing object task. However, Step S14 must be performed for only one of the two tasks 31 and 32. Therefore, the computer 10 does not perform Step S14 during an execution of one of the two tasks 31 and 32. That is, for example, during an execution of the first task 31, which is determined as a process execution task, Step S14 is not performed.

Then, the computer 10 performs core allocation and scheduling in Step S15 for the first task 31 according to (i) an analysis result of the data dependency relationship and (ii) a determination result that is based on the core-dependency information 41.

Then, the computer 10 determines the next task, i.e., the second task 32, as a process execution task. That is, for the second task 32, the computer 10 performs Step S14, and performs core allocation and scheduling in Step S15 according to the allocation restriction and the data dependency relationship.

In Step S16, it is determined about all the tasks whether the task has been processed. That is, when there is any task which has not undergone Steps S10-S15 among all the tasks, the computer 10 determines that such a task is not processed, and the process returns to Step S10.

Figure 4:
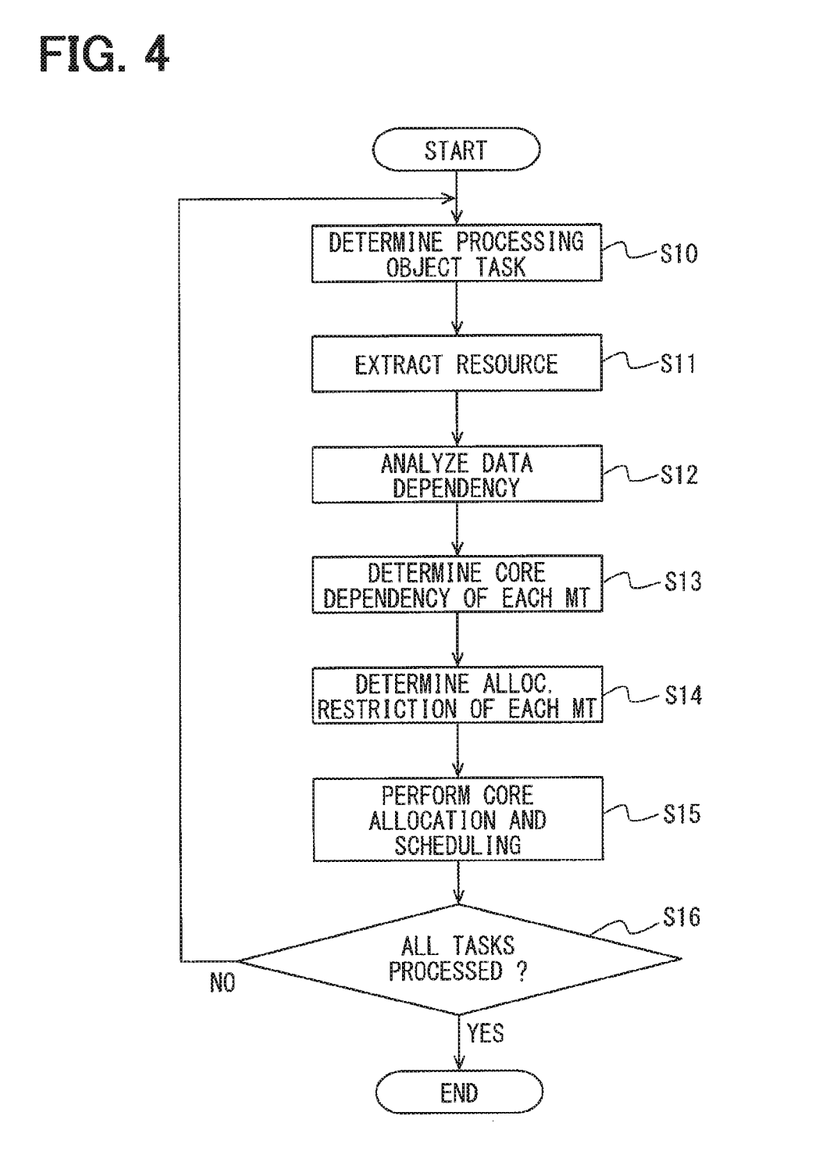
FIG. 4 is a flowchart of a process of the computer in the embodiment of the present disclosure.

When there is no task which has not undergone Steps S10-S15 among all the tasks, the computer 10 determines that all tasks have been processed, and ends the process of FIG. 4.

That is, the computer 10 performs Steps S10-S15 for each of all tasks as a processing object in order. Further, in other words, the computer 10 performs core allocation and scheduling in order for each task.

Figure 8:
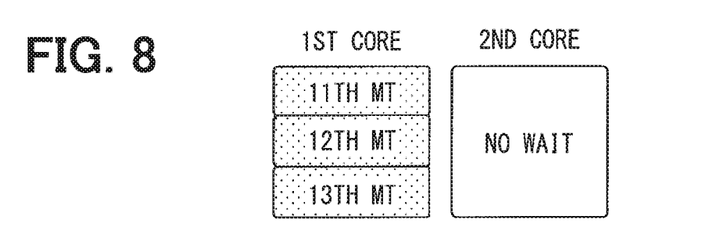
FIG. 8 is an illustration of a scheduling result of a first task in the embodiment of the present disclosure.
Figure 10:
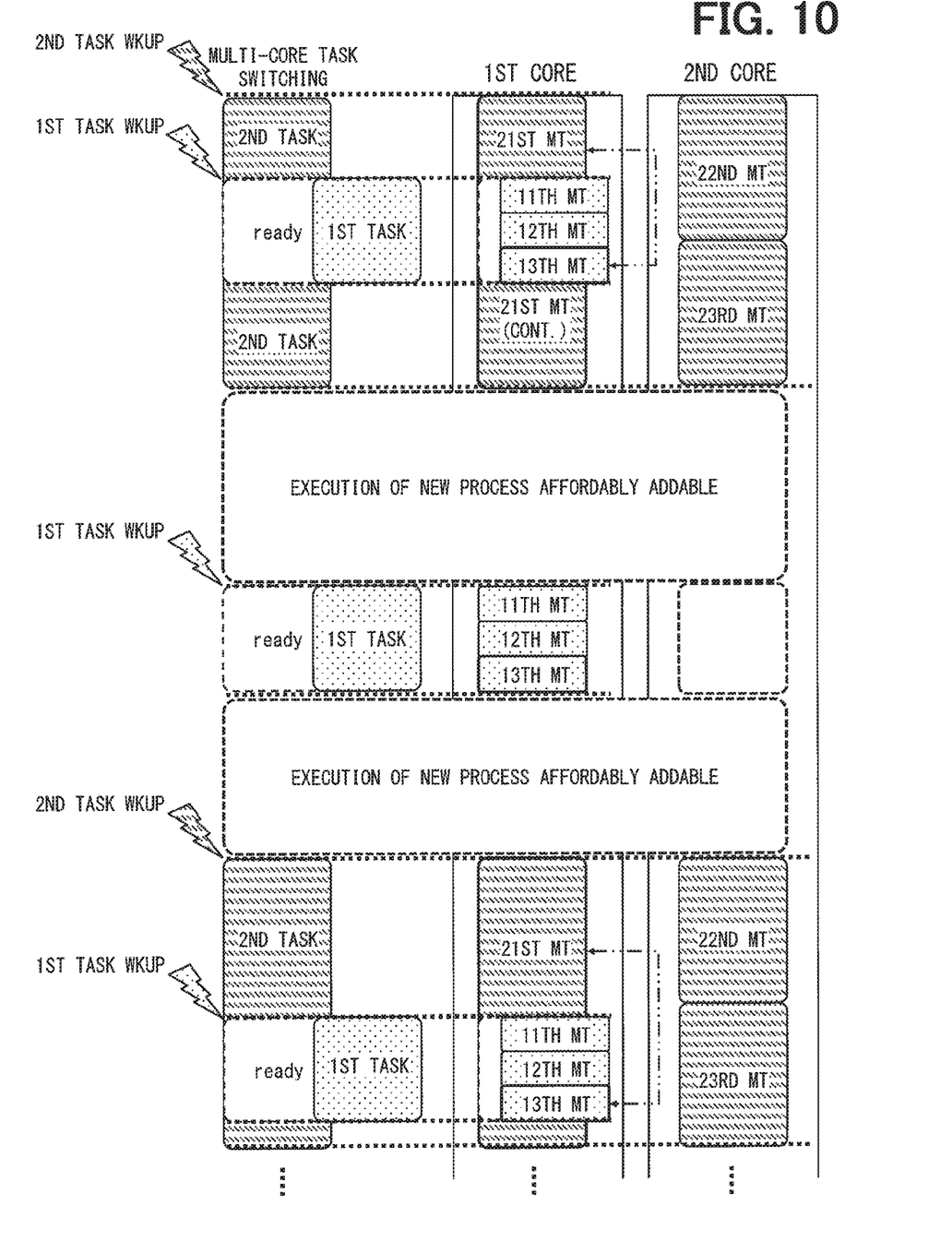
FIG. 10 is an illustration of a task switching among multiple cores and an allocation result of each MT in the embodiment of the present disclosure.

The computer 10 generates the parallel program 21a1 shown in FIG. 10 from the single program 30 shown in FIG. 5 by performing the process in such manner. By performing scheduling for each MT of the first task 31 as shown in FIG. 8, the computer 10 allocates all MTs to the first core 21c, which is the post-parallelization the first task 31a.

Figure 9:
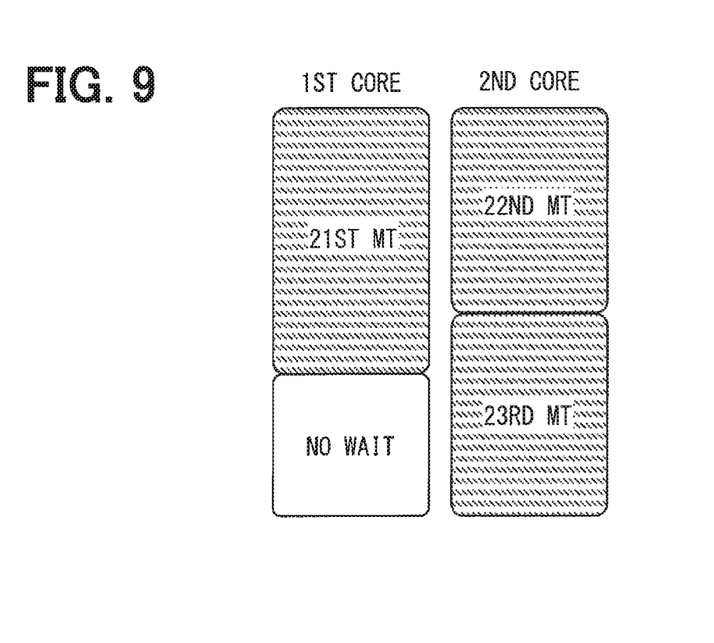
FIG. 9 is an illustration of a scheduling result of a second task in the embodiment of the present disclosure.

Further, by performing scheduling for each MT of the second task 32 as shown in FIG. 9, the computer 10 allocates the 21st MT having a data dependency relationship with the 13th MT to the same first core 21c to which the 13th MT is allocated.

Further, the computer 10 soft-combines the post-parallelization first task 31a and the post-parallelization second task 32a, and generates the parallel program 21a1 shown in FIG. 10.

Further, the computer 10 allocates the 13th MT of the first task 31 and the 21st MT of the second task 32 with the data dependency relationship to the same core.

Therefore, interference among the different tasks is prevented by the computer 10 by implementing a measure such as an intra-core exclusion process which may prohibit interruption or the like.

The intra-core exclusion process is basically added and included in a program design before parallelization. However, the intra-core exclusion process may also be added based on an analysis result as needed, and the parallel program 21a1 is generated accordingly (i.e., an allocator in the claims).

Here, as shown by a two-dot chain line of FIG. 10, the computer 10 adds the intra-core exclusion process to the 13th MT of the first task 31 and to the 21st MT of the second task 32.

Note that the intra-core exclusion process is included in the single program 30 from the beginning. Further, the automatic parallelization compiler 1 is considered as including an allocation procedure.

As described above, the computer 10 analyzes a commonly-accessed resource, and extracts the multiple MTs that show access to such common resource, thereby enabled to extract an MT which accesses the common resource among MTs included in the different tasks.

Further, since the computer 10 allocates the multiple extracted MTs to the same core in the multi-core processor 21, thereby enabled to reduce or eliminate the inter-core exclusion process.

Therefore, the computer 10 is capable of generating the parallel program 21al which can reduce the overhead of the execution time when executed by the multi-core processor 21. In addition to the above, the computer 10 is capable of generating the parallel program 21a1 which has more room, i.e., can afford, to add/accommodate new processes than a program that includes an inter-core exclusion process, as shown in FIG. 10.

Note that, since the computer 10 generates the parallel program by performing the automatic parallelization compiler 1, the automatic parallelization compiler 1 has the same effects as the computer 10.

Further, even if the computer 10 is not provided with the first core dependency determiner 1c and the second core dependency determiner 2c, the computer 10 can still achieve the same object. Therefore, the computer 10 does not need to perform Step S13.

In such case, the computer 10 allocates the multiple MTs which show access to the common resource from the different tasks to the same core regardless of the core dependency in Step S14.

Next, the configuration of the in-vehicle device 20 is described.

Figure 2:
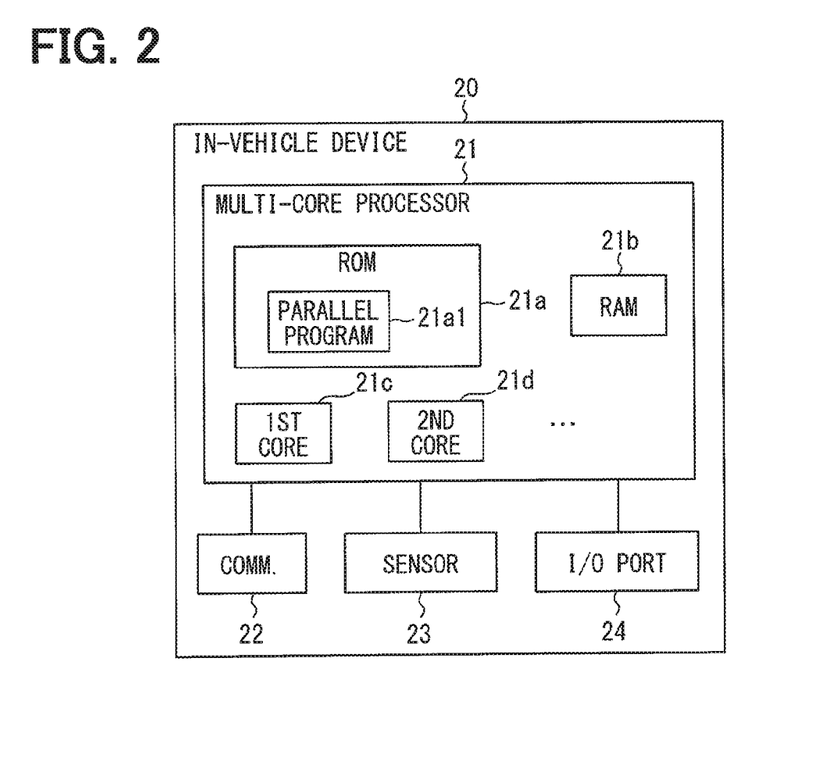
FIG. 2 is a block diagram of a configuration of an in-vehicle device in the embodiment of the present disclosure.

The in-vehicle device 20 includes the multi-core processor 21, a communicator 22, a sensor 23, and an input/output port 24, as shown in FIG. 2. The multi-core processor 21 is provided with a ROM 21a, a RAM 21b, the first core 21c, and the second core 21d.

The in-vehicle device 20 is applicable to an engine control device, a hybrid controlling device, and the like, which are disposed in a vehicle, for example. However, the parallel program 21a1 is not limited to such. The core may also be designated as a processor element.

The first core 21c and the second core 21d execute the parallel program 21a1 for performing an engine control, a hybrid control, and the like. That is, the in-vehicle device 20 performs an engine control, a hybrid control, and the like, by using the first core 21c and the second core 21d which respectively execute MT assigned either to the first core 21c or to the second core 21d.

Thus, the in-vehicle device 20 is provided with the multi-core processor 21 and the parallel program 21a1 generated as mentioned above.

Further, in the multi-core processor 21, each of the cores 21c and 21d execute the parallel program 21a. That is, the in-vehicle device 20 executes the parallel program 21a1 in which an overhead is reduced.

Therefore, the in-vehicle device 20 can perform each MT in an optimal manner.

The overhead may cause capacity deterioration of the multi-core processor 21. Therefore, in other words, the multi-core processor 21 executes the parallel program 21a1, in which the overhead is reduced, thereby reducing the capacity deterioration.

Please refer to a RAM 420, a communications part 430, a sensor part 450, and an input/output port 460 which are disclosed in the patent document No. JP 2015-1807 A about the details of the RAM 21b, the communicator 22, the sensor 23, and the input/output port 24.

When the multiple MTs, which respectively show access to the common resource from the different tasks are extracted, the computer 10 cannot always allocate the multiple MTs to the same core. In such case, the computer 10 allocates the multiple extracted MTs to the different cores. That is, the computer 10 divisibly allocates the multiple extracted MTs to the first core 21c and to the second core 21d.

Then, in order to avoid that the first core 21c and the second core 21d respectively perform one of the multiple MTs and respectively access the common resource simultaneously, the computer 10 may add the inter-core exclusion process for generating the parallel program 21a1 (i.e., an adder in the claims). Note that, as the inter-core exclusion process, a semaphore or the like is employable, for example.

Therefore, in other words, it may be described that the computer 10 generates the parallel program 21a1 including an inter-core exclusion process. That is, the computer 10 adds a process for controlling/avoiding a competition (i.e., interference) for accessing the common resource among the different cores to which the multiple extracted MTs have been allocated, for generating the parallel program 21a1.

Therefore, the computer 10 is capable of generating the parallel program 21a1 with which the competition to the common resource by/among the first core 21c and the second core 21d is reduced, even when the multiple MTs respectively showing access to the common resource from the different tasks have been allocated to two different cores 21c and 21d.

Note that the automatic parallelization compiler 1 can achieve the same effects as the computer 10. Further, the adder serves as an addition procedure of the automatic parallelization compiler 1.

Further, when divisibly allocating the multiple MTs, which respectively show access to the common resource from the different tasks to the first core 21c and to the second core 21d, the computer 10 may add an interruption process for generating the parallel program 21a1 (i.e., an adder in the claims).

That is, in order to avoid that the first core 21c and the second core 21d respectively perform one of the multiple MTs, and respectively access the common resource simultaneously, the computer 10 may add the interruption process to interrupt an execution of the other MT during an execution of the one of the multiple MTs.

Therefore, in other words, it may be described that the computer 10 generates the parallel program 21a1 including an interruption process. That is, the computer 10 adds a process for controlling/avoiding the competition (i.e., interference) for accessing the common resource among the different cores to which the multiple extracted MTs have been allocated, for generating the parallel program 21a1.

Thus, the computer 10 is capable of generating the parallel program 21a1 with which the competition to the common resource by/among the first core 21c and the second core 21d is reduced, even when the multiple MTs respectively showing access to the common resource from the different tasks have been allocated to the two different cores 21c and 21d.

Note that the automatic parallelization compiler 1 can achieve the same effects as the computer 10. Further, the adder in the claims is equivalent to the additional procedure of the automatic parallelization compiler 1.

Further, the above-described configuration in the present embodiment may be applicable even to the single program 30 including the three or more tasks. In such case, the computer 10 has to have an increased number of function blocks according to the number of the tasks. However, regarding the function block that includes the MT group extractor 2d and the like, the computer 10 needs to have only one such function block.

Although the present disclosure has been described in connection with preferred embodiment thereof with reference to the accompanying drawings, it is to be noted that various changes and modifications will become apparent to those skilled in the art.

(Modification)

The modification of the present disclosure is described with reference to FIG. 11 and FIG. 12.

The modification is different from the computer 10 in that a computer 10a in the modification performs core allocation and scheduling at one time for all the tasks.

In the modification, the single program 30 includes three tasks, a first task 33, a second task 34, and a third task 35. Note that, however, in the modification, the single program 30 may also include two tasks or the single program 30 may also include four or more tasks.

The computer 10a generates the parallel program by executing the automatic parallelization compiler of the modification.

Figure 11:
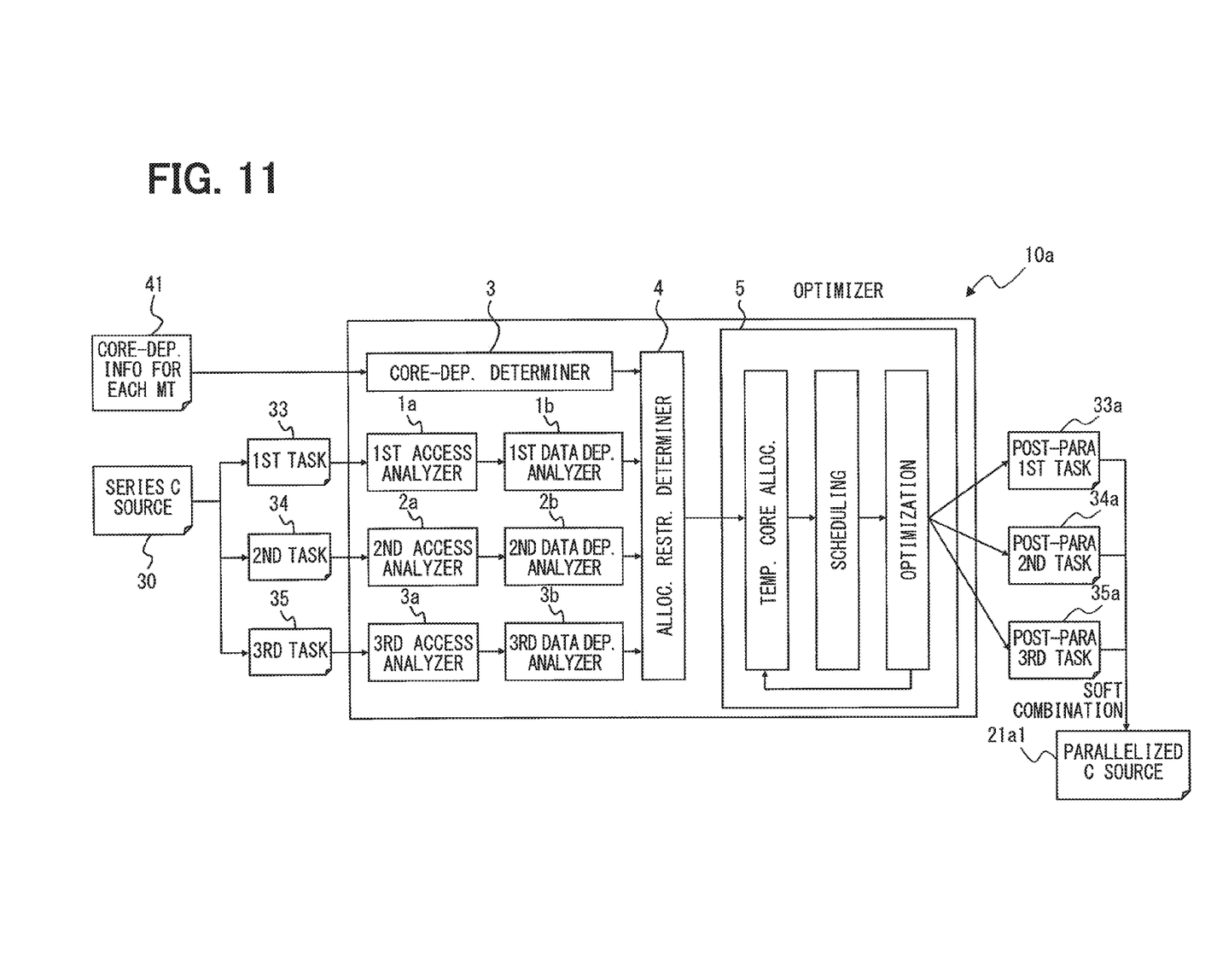
FIG. 11 is a block diagram of the functions of the computer in a modification of the present disclosure.

As shown in FIG. 11, the computer 10 includes the first access analyzer 1a and the first data dependency analyzer 1b as the function blocks for the first task 33, and includes the second access analyzer 2a and the second data dependency analyzer 2b as the function blocks for the second task 34. Further, the computer 10 includes a third access analyzer 3a and a third data dependency analyzer 3b as the function blocks for the third task 35.

The third access analyzer 3a is the same as the first access analyzer 1a or the second access analyzer 2a. The third data dependency analyzer 3b is the same as the first data dependency analyzer 1b or the second data dependency analyzer 2b.

Further, the computer 10 includes a core dependency determiner 3, an allocation restriction determiner 4, and an optimizer 5 each as a common function block.

The core dependency determiner 3 is the same as the first core dependency determiner 1c or the second core dependency determiner 2c.

The allocation restriction determiner 4 is equivalent to the MT group extractor 2d and the allocation restriction determiner 2e (i.e., an allocator in the claims).

The allocation restriction determiner 4 determines the core allocation restriction that is determined based on the core dependency and the access resource of each task. That is, the allocation restriction determiner 4 extracts an MT group that shows access to the common resource from the different tasks.

Then, the allocation restriction determiner 4 determines the allocation restriction of each MT based on the determination result of the core dependency determiner 3 and the extracted MT group.

That is, the allocation restriction determiner 4 allocates the multiple extracted MTs to the same core in the multi-core processor 21 in consideration of the determination result of the core dependency determiner 3.

Further, the allocation restriction determiner 4 allocates the multiple extracted MTs to the same core in the multi-core processor 21 within the limits which do not change the allocation destinations specified by the core dependency determiner 3.

Note that the allocation restriction determiner 4 may add the intra-core exclusion process, in order to avoid the interference between the multiple extracted tasks, when the multiple extracted MTs have been allocated to the same core in the multi-core processor 21, just like the computer 10 (i.e., an allocator in the claims).

As mentioned above, the automatic parallelization compiler in the modification may be described as including an allocation procedure in the claims.

The optimizer 5 is a function block that performs a temporary core allocation, scheduling, and an optimization. The optimizer 5 is equivalent to the first scheduler 1*d* and to the second scheduler 2*f*.

The optimizer 5 performs the temporary core allocation about MTs of each task that does not have the core allocation restriction, and performs scheduling for each task, and optimizes a process balance of each task.

In the following, the processing operation of the computer 10*a* is described with reference to FIG. 12. Note that each of the following steps S20-S29 is equivalent to a procedure of the automatic parallelization compiler 1 in the modification.

Step S20-Step S22 are the same as Step S10-Step S12.

In Step S23, it is determined about all the tasks whether the task has been processed in terms of Steps S20-S22.

When there is any task which has not undergone any one of Steps S20-S22 among all the tasks, the computer 10 determines that the processing of the tasks is not yet complete, and the process returns to Step S20.

When there is no task which has not undergone Steps S20-S22 among all the tasks, the computer 10 determines that the processing of all the tasks is complete, and the process proceeds to Step S24.

In Step S24, core dependency of each MT is determined.

The computer 10*a* may determine the core dependency of each MT according to the core-dependency information 41, which specifies that a certain MT must be executed by a certain core due to functional safety reasons, for example. Step S24 may be considered as a process which is executed by the core dependency determiner 3.

In Step S25, the core allocation of each MT is determined.

The computer 10*a* determines, regarding an MT whose allocation to a certain core is determinable according to an existing core dependency, the core allocation of each MT of all the tasks.

Further, the computer 10*a* allocates, to the same core, an MT group which accesses the common resource in each task.

Step S25 may be considered as a process which is executed by the allocation restriction determiner 4.

In Step S26, each of not-yet allocated MTs is temporarily allocated to a certain core (i.e., a temporary core allocation).

The computer 10*a* temporarily allocates an MT which has not been allocated to any core in Step S25 to an arbitrary core.

In Step S27, an execution sequence of each MT is determined (i.e., scheduling).

The computer 10*a* determines an execution sequence of each MT in each task.

In Step S28, an evaluation function is calculated.

The computer 10*a* calculates an evaluation function, in a state that each MT is temporarily allocated. The evaluation function is an index for a degree of optimization of the core allocation.

The evaluation function may be, for example, formulated as a division of (sum total of processing time of each core) divided by (a maximum processing time of each core). That is, the evaluation function may take a following form.

Evaluation function=$\Sigma(A \times B)/\max(A \times B)$ where A: {execution frequency of each task}

B: {processing time of each task by each core}

In Step S29, it is determined whether the evaluation function takes the maximum value. That is, the computer 10*a* determines whether the value obtained by calculating the evaluation function is the maximum value.

When the evaluation function is not determined as maximized, the computer 10*a* interprets that the process balance in each task has not been optimized, and the process returns to Step S26.

Figure 12:
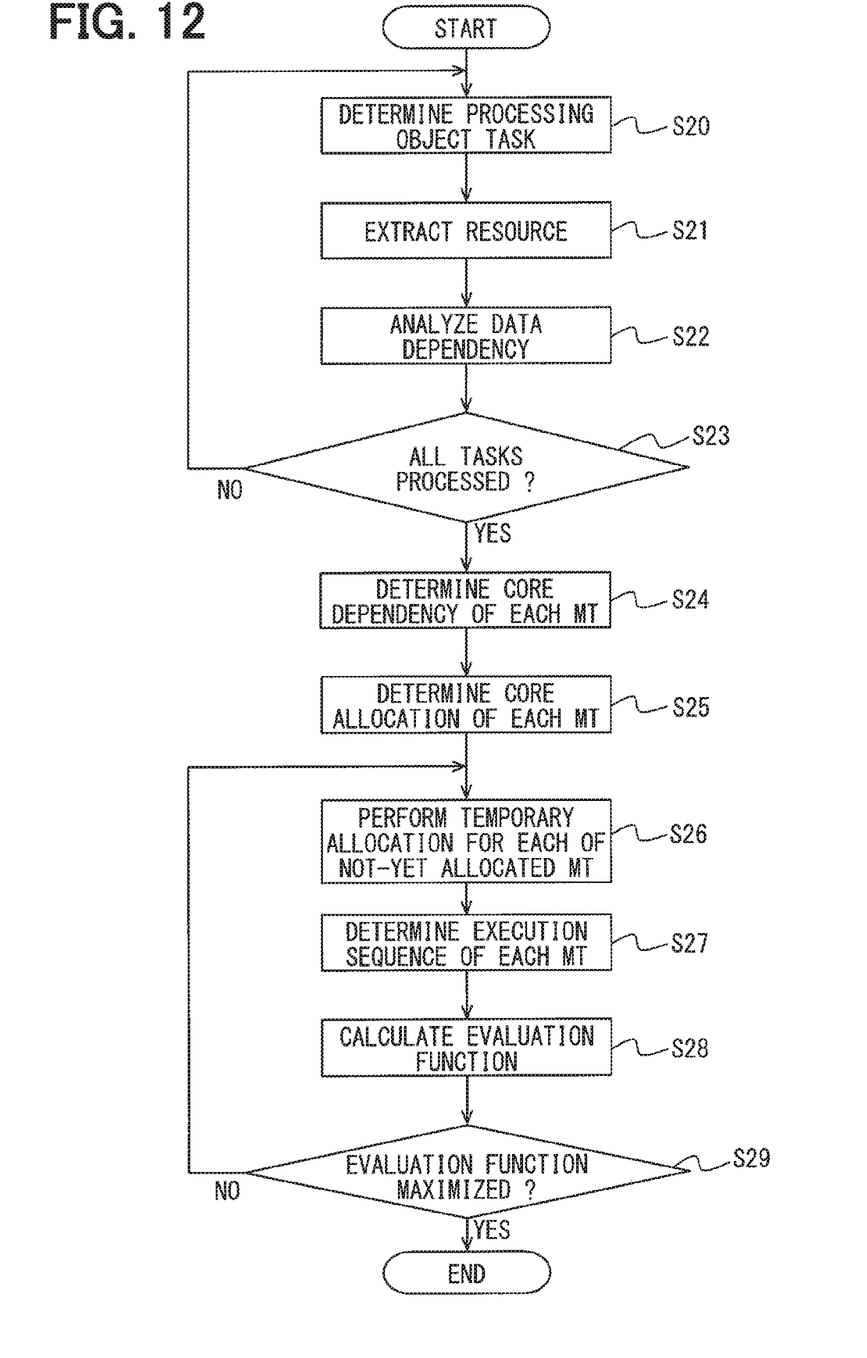
FIG. 12 is a flowchart of the process of the computer in the modification of the present disclosure.

When the evaluation function is determined as maximized, the computer 10*a* interprets that the process balance in each task is optimized, and ends the process of FIG. 12. That is, the optimization of process balance is achieved when the evaluation function for evaluating the allocation of MTs to the cores is maximized.

In other words, for the optimization of the process balance, one of the allocations of MTs to the cores that maximize the value of the evaluation function may be picked up.

However, since the evaluation scale may soar/skyrocket as the number of MTs increases, a certain efficient search algorithm may preferably be used. Note that an efficient search algorithm is not a necessary requirement, however.

As described above, by repeating Steps S26-S29, the computer 10*a* optimizes a process balance in each task, i.e., optimizes the core allocation of each MT. That is, the computer 10*a* optimizes the process balance in each task, by replacing the core allocation of each MT that is performed via temporary allocation of MT to the cores. These steps S26-S29 is considered as a process performed by the optimizer 5.

The computer 10*a* generates a post-parallelization first task 33*a*, a post-parallelization second task 34*a*, and a post-parallelization third task 35*a* from the single program 30 by performing the process in the above-described manner. Then, the computer 10*a* soft-combines the post-parallelization first task 33*a* to the post-parallelization third task 35*a* to generate the parallel program 21*al*.

The computer 10*a* achieves the same effects as the computer 10. Further, the automatic parallelization compiler in the modification also achieves the same effects as the computer 10*a*.

Note that, the computer 10*a* can achieve the same object without having the core dependency determiner 3. Therefore, the computer 10*a* does not need to perform Step S24.

In such case, the computer 10*a* (i.e., the allocation restriction determiner 4) allocates, in Step S25, the multiple MTs which respectively show access to the common resource from the different tasks to the same core regardless of the core dependency.

Such changes, modifications, and summarized schemes are to be understood as being in the scope of the present disclosure as defined by appended claims.

What is claimed is:

1. A parallelization method that generates a parallel program for a multi-core microcomputer having multiple cores, the parallel program parallelizing parallelizable unit processes based on (i) an analysis of a single program for a single-core microcomputer that includes multiple tasks, and (ii) a dependency relationship derived from the analysis and indicative of an access to a same resource from the unit processes, the parallelization method comprising:

an extraction procedure extracting a plurality of the unit processes accessing the same resource based on an analysis of the same resource commonly accessed by the multiple tasks; and an allocation procedure allocating the plurality of the unit processes extracted by the extraction procedure and included in different tasks to access the same resource to a same core of the multi-core microcomputer to prevent from generating an interference among the multiple cores so that the plurality of the unit processes includes an intra-core exclusion process, wherein the interference is caused by the same resource commonly accessed by the multiple tasks; and the intra-core exclusion process is a process that performs a task interruption prohibition, and a task interruption permission.

2. The parallelization method of claim 1, wherein the allocation procedure adds another intra-core exclusion process to the plurality of the unit processes that have been extracted by the extraction procedure, and have been allocated to a same core of the multi-core microcomputer.

3. The parallelization method of claim 1, wherein the allocation procedure allocates the plurality of the unit processes extracted by the extraction procedure to different cores of the multi-core microcomputer, when the plurality of the unit processes extracted by the extraction procedure cannot be allocated to the same core of the multi-core microcomputer, and the parallelization method further comprises an addition procedure adding an inter-core exclusion process that prevents an access to the same resource from the different cores that respectively execute each of the plurality of the unit processes in case that the allocation procedure has allocated the plurality of the unit processes extracted by the extraction procedure to the different cores of the multi-core microcomputer.

4. The parallelization method of claim 1, wherein the allocation procedure allocates the plurality of the unit processes extracted by the extraction procedure to different cores of the multi-core microcomputer, when the plurality of the unit processes extracted by the extraction procedure cannot be allocated to the same core of the multi-core microcomputer, and the parallelization method further comprises an interruption procedure adding an interruption process that prevents an access to the same resource from the different cores that respectively execute each of the plurality of the unit processes, by interrupting rest of the plurality of the unit processes during the access to the same resource by one of the plurality of the unit processes, when the allocation procedure allocates the plurality of the unit processes extracted by the extraction procedure to the different cores of the multi-core microcomputer.

5. The parallelization method of claim 1, wherein core allocation information indicative of allocation destination of each of the plurality of the unit processes of the single program is obtained to allocate the plurality of the unit processes to the multiple cores of the multi-core microcomputer, and the allocation procedure prioritizes the core allocation information in allocating the plurality of the unit processes to specified cores, and allocates the plurality of the unit processes extracted by the extraction procedure to the same core of the multi-core microcomputer.

6. A parallelization tool including a computer for generating a parallel program by parallelizing parallelizable unit processes for a multi-core microcomputer having multiple cores based on a dependency relationship indicative of an access to a same resource from plural unit processes of a single program, according to an analysis of a single program including multiple tasks for a single-core microcomputer, the parallelization tool comprising:

an extractor extracting a plurality of the unit processes accessing the same resource based on an analysis of the same resource commonly accessed by the multiple tasks; and an allocator allocating the plurality of the unit processes extracted by the extractor and included in different tasks to access the same resource to a same core of the multi-core microcomputer to prevent from generating an interference among the multiple cores so that the plurality of the unit processes includes an intra-core exclusion process, wherein the interference is caused by the same resource commonly accessed by the multiple tasks; and the intra-core exclusion process is a process that performs a task interruption prohibition, and a task interruption permission.

7. The parallelization tool of claim 6, wherein the allocator adds another intra-core exclusion process to the plurality of the unit processes that have been extracted by the extractor, and have been allocated to the same core of the multi-core microcomputer.

8. The parallelization tool of claim 6, wherein the allocator allocates the plurality of the unit processes extracted by the extractor to different cores of the multi-core microcomputer, when the plurality of the unit processes extracted by the extractor cannot be allocated to the same core of the multi-core microcomputer, and the parallelization device further comprises an adder adding an inter-core exclusion process that prevents an access to the same resource from the different cores that respectively execute the plurality of the unit processes in case that the allocator has allocated the plurality of the unit processes extracted by the extractor to the different cores of the multi-core microcomputer.

9. The parallelization tool of claim 6, wherein the allocator allocates the plurality of the unit processes extracted by the extractor to different cores of the multi-core microcomputer, when the plurality of the unit processes extracted by the extractor cannot be allocated to the same core of the multi-core microcomputer, and the parallelization tool further comprises an interrupter adding an interruption process that prevents an access to the same resource from the different cores that respectively execute each of the plurality of the unit processes by interrupting rest of the plurality of the unit processes during the access to the same resource by one of the plurality of the unit processes, when the allocator allocates the plurality of the unit processes extracted by the extractor to the different cores of the multi-core microcomputer.

10. The parallelization tool of claim 6, wherein core allocation information indicative of allocation destination of each of the plurality of the unit processes of the single program is obtained by the computer to allocate the plurality of the unit processes to the multiple cores of the multi-core microcomputer, and the allocator prioritizes the core allocation information in allocating the plurality of the unit processes to specified cores, and allocates the plurality of the unit processes extracted by the extractor to the same core of the multi-core microcomputer.

11. An in-vehicle device comprising:

a multi-core microcomputer having multiple cores; and a parallel program parallelizing a plurality of unit process in a single program for a single-core microcomputer, the single program including/processing multiple tasks by a single core, wherein the parallel program is configured to
- (a) parallelize the multiple tasks by parallelizing a plurality of parallelizable unit processes based on a data dependency indicative of an access to a same resource from plural unit processes of the single program, according to an analysis of the single program including the multiple tasks for the single-core microcomputer,
- (b) extract the plural unit processes extracted based on indication of an access to the commonly-accessed resource, by analyzing a commonly-accessed resource commonly accessed from the multiple tasks, and
- (c) allocate the extracted plural unit processes included in different tasks to access the same resource to the same core of the multi-core microcomputer to prevent from generating an interference among the multiple cores so that the plurality of the unit processes includes an intra-core exclusion process, the interference is caused by the same resource commonly accessed by the multiple tasks; and the intra-core exclusion process is a process that performs a task interruption prohibition, and a task interruption permission, and the multi-core microcomputer is configured to execute the parallel program by using the multiple cores to respectively execute the unit processes assigned to the multiple cores.

* * * * *